April 11, 1950     L. MEUNIER     2,503,961
PINFEATHER TOOL
Filed April 16, 1946
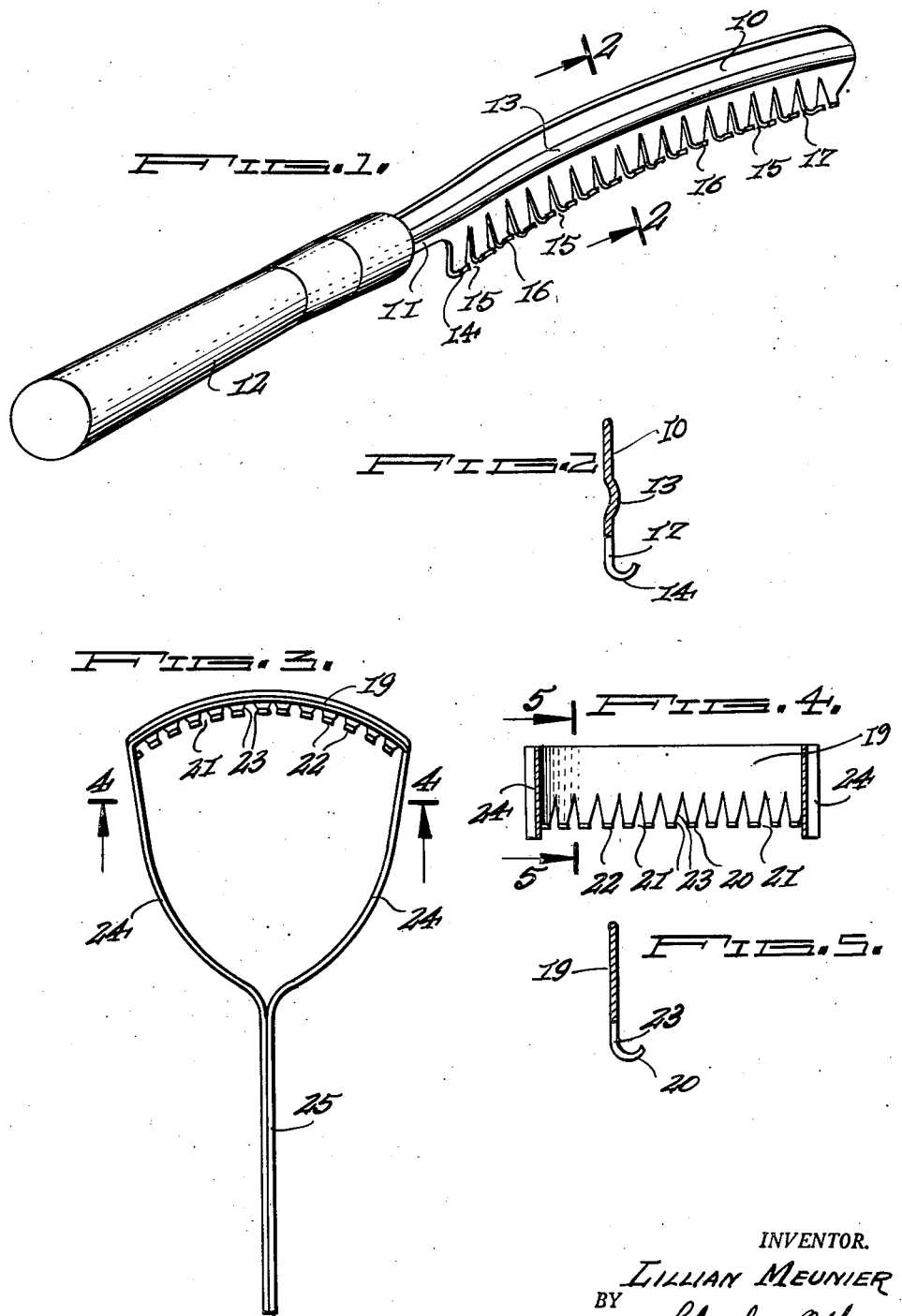
INVENTOR.
LILLIAN MEUNIER
BY
Clark + Ott
ATTORNEYS.

Patented Apr. 11, 1950

2,503,961

UNITED STATES PATENT OFFICE 2,503,961

PINFEATHER TOOL

Lillian Meunier, Great Neck, N. Y.

Application April 16, 1946, Serial No. 662,506

2 Claims. (Cl. 17—11.1)

This invention has particular reference to a hand operated tool for removing pin feathers from poultry and the like.

The invention has in view a hand operated tool provided with a forwardly extending rolled edge portion having a series of equally spaced V-shaped notches therein which open through the rolled edge portion and define a series of downwardly tapering projections or teeth having forwardly curved extremities or terminals adapted to provide a smooth rounded surface for engagement with the surface of the poultry and the like for gripping the ends of the pin feathers in the restricted inner ends of the slots so as to pluck the same from the poultry when the tool is moved over the surface thereof.

The invention further has for an object the provision of a tool of the indicated character having a blade or operating portion of longitudinally arcuate formation and formed with a rolled or curved lip extending longitudinally along the lower edge thereof and projecting forwardly beyond the concave forward face of the blade or operating portion with a series of V-shaped notches formed therein which open through the curved lip and extend upwardly into the body of the blade or operating portion for engagement of the pin feathers in the restricted portion of the notches for plucking the same.

The invention also has in view the provision of a tool of said character which is convenient to operate and which can be manufactured at a relatively low cost and is particularly effective for its intended purpose.

With the foregoing and other objects in view, reference is now made to the following specification and accompanying drawings in which the preferred embodiments of the invention are illustrated.

In the drawings:

Fig. 1 is a perspective view of a tool constructed in accordance with the invention.

Fig. 2 is a vertical sectional view taken approximately on line 2—2 of Fig. 1.

Fig. 3 is a top plan view of a modified form of the invention.

Fig. 4 is a vertical sectional view taken approximately on line 4—4 of Fig. 3.

Fig. 5 is a vertical sectional view taken approximately on line 5—5 of Fig. 4.

Referring to the drawings by characters of reference and more particularly to the form of the invention illustrated in Figs. 1 and 2 thereof, the tool consists of a blade 10 preferably fashioned of sheet metal and which is provided with a shank 11 secured in a handle 12 adapted to be grasped by the operator for manipulating the tool.

The blade 10 is of longitudinally arcuate or bowed formation from the shank 11 to the free outer end thereof and is formed with a longitudinally extending reinforcing rib 13 disposed medially between the upper and lower edges thereof and which extends longitudinally through the shank 11. The lower edge portion of the blade 10 is formed into a rolled or curved lip 14 which extends forwardly beyond the concave forward face of the blade with the upper edge thereof projecting upwardly at an angle to the plane of the blade.

In order to provide means for removing pin feathers from poultry and the like, the lower edge portion of the blade from the shank 11 to the outer free end thereof is formed with a series of V-shaped notches 15 which open through the curved lip 14 thereof and extend upwardly into the body of the blade below the rib 13. The notches 15 are equally spaced apart and define downwardly tapering projections or teeth 16 formed by the flaring opposite side edges 17 of the notches and which teeth have forwardly curved extremities or terminals in the lip portion 14 of the blade.

The notches 15 have restricted apices at the inner ends of the side edges 17 which grip the outer ends of the pin feathers therebetween when the blade is drawn over the surface or skin of the poultry from which the large feathers have been previously removed. This results in a pulling or plucking of the pin feathers from the poultry while the rounded or curved ends of the teeth 16 facilitate the sliding of the blade over the surface of the poultry so as to pick up and engage the pin feathers in the notches 15 without scratching or tearing the skin of the fowl.

In the form of the invention illustrated in Figs. 3 to 5 inclusive of the drawings, the tool is similarly fashioned from a length of sheet material such as metal or synthetic plastics, the same being bent to provide a medial portion 19 of longitudinally arcuate or bowed formation having its lower edge portion formed into a roller or curved lip 20 which extends forwardly beyond the concave forward face thereof with the upper edge of said curved lip projecting upwardly and forwardly. The said lower edge portion is formed with a series of V-shaped notches 21 which open through the curved lip 20 thereof and extend upwardly into the body of said medial portion 19 of the tool. The notches 21 are similar to the notches 15 in the previous form of the invention and define downwardly tapering projections or teeth 22 which have forwardly curved extremities or terminals in the lip portion 20 thereof.

The opposite side edges 23 of the notches 21 converge at their inner ends to form restricted apices which are adapted to grip the outer ends of the pin feathers of poultry or the like to pull or pluck the same similar to the operation described in the previous form of the invention.

Formed integrally with the medial portion 19 of the tool and extending forwardly from the opposite side edges thereof are side arms 24 which converge at their forward ends and are welded or otherwise secured together in side by side relation to form a handle member 25 which is adapted to be gripped for manipulating the tool.

What is claimed is:

1. In a tool of the indicated character, a handle, a blade of longitudinally arcuate formation connected with said handle and having a rib extending longitudinally thereof intermediate its upper and lower edges, said blade having a rounded lower edge portion defining an upwardly directed lip and having a series of V-shaped notches opening through said lip so as to form a series of downwardly depending teeth extending through said rounded lower edge portion and terminating in rounded forwardly and upwardly extending extremities, said notches having restricted apices at the upper ends thereof adjacent said rib and above the outer ends of said teeth for gripping the ends of pin feathers therebetween when the tool is manipulated to move the rounded lower edge portion thereof over the surface of fowl.

2. In a tool of the indicated character, a handle, a blade of longitudinally arcuate formation connected with said handle, said blade having a rounded lower edge portion defining an upwardly directed lip and having a series of V-shaped notches opening through said lip so as to form a series of downwardly depending teeth extending through said rounded lower edge portion and terminating in rounded forwardly and upwardly extending extremities, said notches having restricted apices at the upper ends thereof above the outer ends of said teeth for gripping the ends of pin feathers therebetween when the tool is manipulated to move the rounded lower edge portion thereof over the surface of fowl.

LILLIAN MEUNIER.

REFERENCES CITED

The following references are of record in the file of this patent:

UNITED STATES PATENTS

| Number | Name | Date |
|---|---|---|
| 173,799 | Lawton | Feb. 22, 1876 |
| 1,236,369 | Easby et al. | Aug. 7, 1917 |
| 1,660,748 | Frost | Feb. 28, 1928 |
| 2,148,944 | Helm | Feb. 28, 1939 |

FOREIGN PATENTS

| Number | Country | Date |
|---|---|---|
| 51,252 | Austria | Dec. 27, 1911 |
| 413,955 | Germany | May 19, 1925 |